United States Patent
Sun et al.

(10) Patent No.: US 6,301,387 B1
(45) Date of Patent: Oct. 9, 2001

(54) TEMPLATE MATCHING USING CORRELATIVE AUTO-PREDICTIVE SEARCH

(75) Inventors: Shijun Sun, Seattle, WA (US); Hyun Wook Park, Taejon (KR); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/216,692

(22) Filed: Dec. 18, 1998

(51) Int. Cl.$^7$ .............................. G06K 9/00; G06K 9/62; G06K 9/64; G06K 9/68
(52) U.S. Cl. .................... 382/217; 382/181; 382/209; 382/218; 382/278
(58) Field of Search ............................ 382/181, 209, 382/217, 218, 219, 278, 103, 294; 375/240.12, 240.15; 348/699

(56) References Cited

U.S. PATENT DOCUMENTS

| | | | |
|---|---|---|---|
| 5,359,513 | * | 10/1994 | Kano et al. ........................ 382/128 |
| 5,495,537 | * | 2/1996 | Bedrosian et al. .................... 382/209 |
| 5,784,108 | * | 7/1998 | Skaletzky et al. .............. 375/240.15 |
| 5,911,001 | * | 6/1999 | Kawada ............................... 382/141 |
| 5,943,442 | * | 8/1999 | Tanaka et al. ....................... 382/216 |
| 6,014,181 | * | 1/2000 | Sun ..................................... 348/699 |
| 6,075,557 | * | 6/2000 | Holliman et al. ...................... 348/51 |
| 6,122,320 | * | 9/2000 | Bellifemine et al. ................ 375/240 |

FOREIGN PATENT DOCUMENTS 0806733    11/1997   (EP) .

OTHER PUBLICATIONS

Autere, et al. "robot motion planning by a hierarchical search on a modified discretized configuration space", IEEE, pp. 1208–1213, 1997.*

Ettelt, et al. "Optimized template trees for appearance based object recognition", IEEE, pp. 4536–4541, Jan. 1998.*

Luo, et al. "a new prediction search algorithm for block motion estimation in video coding", IEEE, pp. 56–61, 1997.*

Goshtasby, et al., "A Two–Stage Correlation Approach to Template Matching," IEEE Trans. on Pattern Analysis and Machine Intelligence, vol. PAMI–6, No. 3, May 1984.

Rosenfeld et al., "Coarse–Fine Template Matching," IEEE Trans. on Systems, Man, and Cybernetics; Feb. 1977.

Hirooka et al., "Hierarchical Distributed Template Matching," SPIE vol. 3029 0277–786X/97.

Pratt, William K.; "Correlation Technique of Image Registration," IEEE Trans. on Aerospace and Electronic Systems; vol. AES–10, No. 3; May 1974.

Musmann et al.; "Advances in Picture Coding," Proceedings of the IEEE vol. 73, No. 4; Apr. 1985.

\* cited by examiner

*Primary Examiner*—Leo Boudreau
*Assistant Examiner*—Daniel G. Mariam
(74) *Attorney, Agent, or Firm*—Steven P. Koda

(57) ABSTRACT

A template is analyzed to determine a step size for searching within a search area. First, the template is padded with pixels to increase its size. Cross-correlation between the padded template and the original template leads to identification of an effective step size. Step sizes for each of horizontal and vertical axes are derived. Windows of the search area, selected based on the step size, then are tested in a fast search stage by correlating the template to the window. Any tested window which has a correlation coefficient exceeding a specific value is a local match. A full search of the vicinity of the local match then is performed for all potential windows within an area bounded by one step to either side of the local match along either axis. The location(s) corresponding to the highest correlation(s) exceeding the threshold value are matches.

6 Claims, 6 Drawing Sheets

TEMPLATE MATCHING USING CORRELATIVE AUTO-PREDICTIVE SEARCH

BACKGROUND OF THE INVENTION

This invention relates to template matching within a data domain, and more particularly to a method for locating a given data template within a data domain.

Template matching in the context of an image search is a process of locating the position of a subimage within an image of the same, or more typically, a larger size. The subimage is referred to as the template and the larger image is referred to as the search area. The template matching process involves shifting the template over the search area and computing a similarity between the template and the window of the search area over which the template lies. Another step involves determining a single or a set of matched positions in which there is a good similarity measure between the template and the search area window.

A common technique for measuring similarity in template matching and image registration is cross-correlation. A correlation measure is determined between the template and respective windows of the search area to find the template position which has maximum correlation. For a two-dimensional search area the correlation function generally is computed for all translations of the template within the search area. A statistical correlation measure is a common approach in which window areas are spatially convolved with the template using spatial filter functions. Because this approach is extremely expensive in terms of computation time, a more common computer implementation is to use a sum of absolute differences.

Rosenfeld et al., in "Coarse-Fine Template Matching," IEEE Transactions on Systems, Man and Cybernetics (February 1977, pp. 104–107)describe an approach where a 'reduced-resolution' template is used during a first, coarse evaluation stage. The template is divided into blocks of equal size (e.g., 'm' pixels per block). The average of each block is computed. For each pixel of the search area an average also is calculated over a neighborhood of the same size as the reduced-resolution template (e.g., m pixels). The average absolute difference between each template block average and the picture neighborhood average then is computed for each pixel of the search area. If the average absolute difference for any pixel of the search area is below a threshold value, then a possible match has been identified. Next, the full resolution template is compared to a window of the search area about each pixel point where the average absolute difference in the prior coarse evaluation step was below the threshold value. This fine evaluation step identifies if there actually is a good correlation.

Goshtasby et al. in "A Two-Stage Correlation Approach to Template Matching," IEEE Transaction on Pattern Analysis and Machine Intelligence, (Vol. PAMI-6, No. 3, May 1984), note the need for an accurate threshold value for the first stage evaluation. They describe a method for deriving the threshold value based upon sub-template size and false dismissal probability.

The coarse-fine or two stage method subsample the template to match with the image. The task of subsampling the template is not a trivial task and contributes significant processing cost. In addition, the false alarms result in wasted, or an ineffective use of, processing time. Accordingly, there is a need for a more efficient method of template matching.

In the area of motion estimation for digital video and multimedia communications a three stage correlation strategy is used. In a first step, a search step size of 4 is used. Once a maximum point is found, the step size is reduced to 2 to evaluate the neighborhood of the previously determined point to choose the next search point. The third step is to search all neighboring points to find the best match. This approach speeds up the search process, but also has a high probability of mismatches or suboptimal matches. It also has difficulty handling cases in which multiple match points occur. Thus, there is a need for a more reliable, fast search method for correlating a template to windows of a search area.

SUMMARY OF THE INVENTION

According to the invention, a correlation auto-predictive search method is used to compare a template to windows of a search area. The location(s) where the template has the highest correlation coefficient with the underlying window is selected as a match for the template. Local maximum criteria or other criteria then are used to select one or more match points within the search area. The principle of a correlation auto-predictive search as conceived by the inventors is (1) to extract statistical information from the template itself to determine the search step size, and (2) to perform fast searching based on this extracted information.

According to one aspect of the invention, during a first analytical step, autocorrelation is performed on the template to generate desired statistics. To use autocorrelation, the original template is padded with additional pixels to increase the template size. In one approach, where the search area is assumed to be periodic, circular padding is used. In such approach the padded template is an array of copies of the original template. This increases the template size to the search area (image) size.

In another approach linear padding is used in which pixels are added around the original template to increase the size of the template to the search area (image) size. According to an aspect of this invention, a mean pixel value of the original template is used as a padding constant (i.e., pixel value for the added pixels). Alternatively, a value of zero or another fixed value may be used as the padding constant for the padded pixels.

After generating the padded template, cross-correlation is performed between the padded template and the original template. The autocorrelation is highest at the center of the padded template as this area is formed by the original template. This corresponds to a peak in a graph of the autocorrelation of the padded template to original template. The width of the peak, either along a horizontal direction of the padded template, or along a vertical direction of the padded template, may be measured. The height of the maximum peak is 1.0. The horizontal width is taken as the distance along the horizontal axis between autocorrelation values of 0.5 to each side of the maximum peak. Similarly, the vertical width is taken as the distance along the vertical axis between autocorrelation values of 0.5 to each side of the maximum peak. Such value, 0.5, is referred to herein as the cut value. The cut value may differ.

According to another aspect of the invention, the autocorrelation between the padded template and the original template is not calculated for every point of the padded template. At the center of the padded template, the correlation is known to be 1.0 because the original template is located at such center of the padded template. The correlation then is derived about the center of the padded template along both horizontal and vertical axes. As the correlations are derived during this stepping along the axes, there comes a point where the correlation decreases to the cut value. Along the horizontal axis, there is a cut value reached to either direction of center. The horizontal distance between these two locations where the correlation has decreased to the cut value is the horizontal width. Further correlations along such axis need not be derived. Along the vertical axis, there also is a cut value reached to either direction of center. The vertical distance between these two locations where the correlation has decreased to the cut value is the vertical width. Further correlations along such vertical axis need not be derived. Thus, correlation coefficients are derived only for the steps along the axes away from center, and only to the step where the cut value is reached.

Next, horizontal step size and vertical step size are derived from the horizontal width and vertical width, respectively. In one embodiment the horizontal step size is 0.5 times the horizontal width. Similarly, a vertical step size is 0.5 times the vertical width. These step sizes are the correlative auto-predictive search (CAPS) step sizes. No additional correlation values need be derived between the padded template and the original template. The CAPS step sizes, then are used for template matching between the original template and the search area.

According to another aspect of this invention, a fast search then is performed between the template and the search area using the derived step sizes. Then, for correlations having a correlation coefficient exceeding a specific value, a full search is performed locally in each area where the fast search resulted a correlation coefficient exceeding the select value.

According to another aspect of the invention, the fast search is performed as a set of correlation between the original template and the search area. Specifically, a correlation is performed between the template and a window area within the search area. The set of correlations is selected by choosing window areas based upon the step size. For example, one window is the center of the search area. A positive or negative step then is taken along an axis using the corresponding horizontal width or vertical width to derive a correlation for another window. Any of the correlations which result in a correlation coefficient exceeding a specific value is considered a local match point.

According to another aspect of this invention, the specific value used to identify a local match during the fast search is the cut value times a threshold value. The cut value is the same cut value used during the first analytical step described above, to derive statistics from the template. The threshold value is assigned based upon image characteristics. Typical threshold values are between 0.8 and 0.9.

One or more locations are identified as local match points based upon the whether the correlation coefficient between the template and that location exceed the specific value (e.g., cut value times threshold value).

According to another aspect of the invention, a full search then is performed in the vicinity of any location which is a local match. A full search of such vicinity encompasses performing a correlation between the template and every potential search area window between the local match location window and the windows at the prior and next step in each of the horizontal and vertical axes. For example, if the horizontal step size is 3 pixels and the vertical step size is 4 pixels, then correlations are performed for windows ±1 pixel and ±2 pixels along the horizontal axis and ±1 pixel, ±2 pixels and ±3 pixels along the vertical axis. In addition correlations are performed for windows off the axes within the area delineated by the step sizes. Thus, the full search of the vicinity of the local match for this example includes 34 correlations between the template and the search area. Any locations among the local match locations and the locations tested during the full search of the vicinity which exceed the threshold value are considered template matches. In some embodiments, the only the location having the highest correlation is considered a match. In other embodiments there may be multiple matches. Thus, the top matches or all matches above the threshold are selected as resultant matches.

One advantage of the invention is that template matches are found more quickly and with greater reliability than prior correlation search methods. In particular, this search methodology is more tolerant of noise and offsets of the template as demonstrated empirically by forming a search area from copies of templates altered by low pass filtering or Gaussian noise. These and other aspects and advantages of the invention will be better understood by reference to the following detailed description taken in conjunction with the accompanying drawings.

DESCRIPTION OF SPECIFIC EMBODIMENTS

Exemplary Host Computer System

Figure 1:
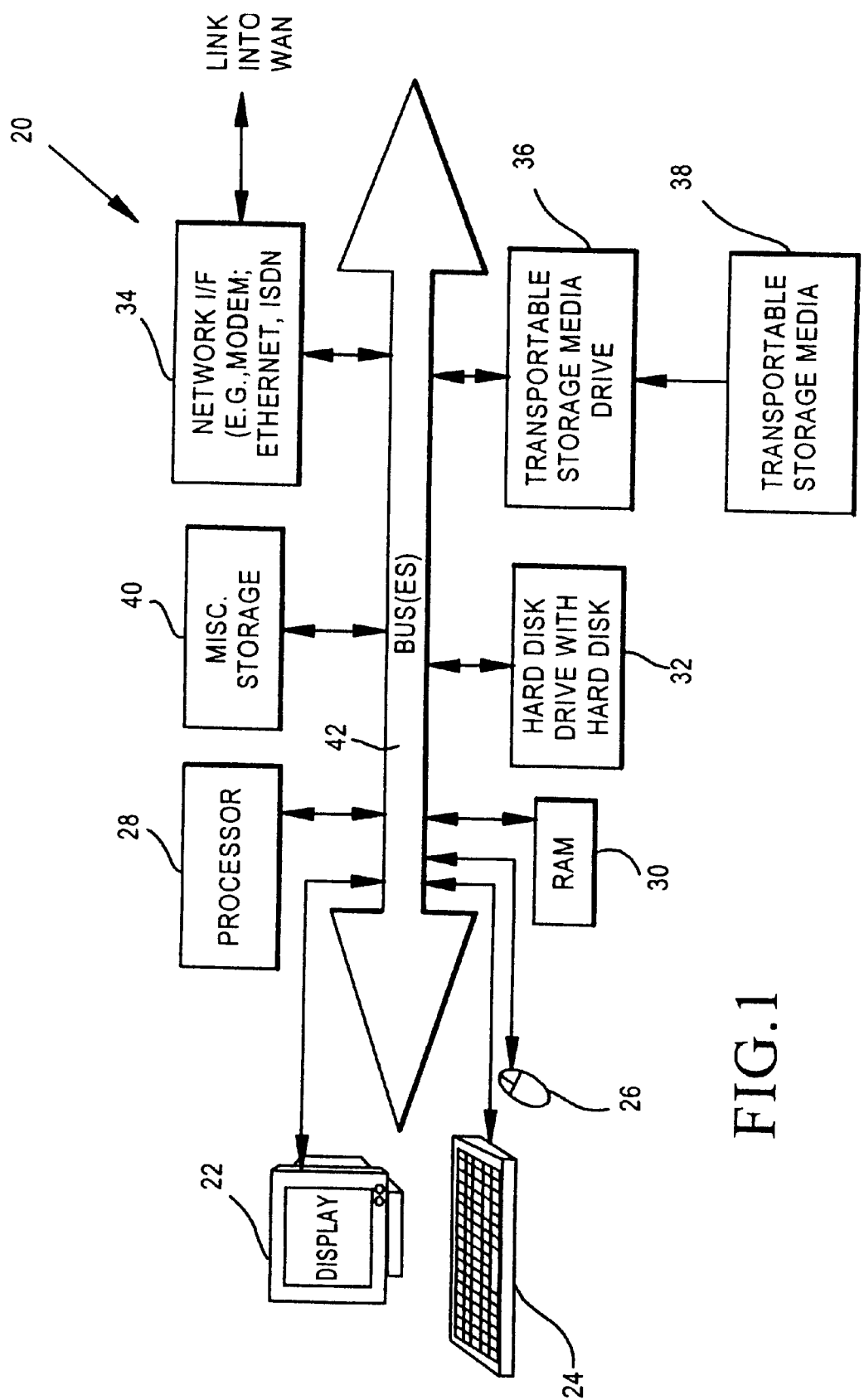
FIG. 1 is a block diagram of a host computer system for implementing the method embodiments of this invention.

The functions of the present invention preferably are performed by programmed digital computers of the type which are well known in the art, an example of which is shown in FIG. 1. A computer system 10 has a display monitor 12, a keyboard 14, a pointing/clicking device 16, a processor 18, random access memory (RAM) 20, a non-volatile storage device such as a hard disk drive 22, a communication or network interface 24 (e.g., modem; ethernet adapter), and a transportable storage media drive 26, such as a floppy disk drive, CD-ROM drive, zip drive, bernoulli drive or other magnetic, optical or other storage media, which reads transportable storage media 28. The various components interface and exchange data and commands through one or more busses 32. The computer system 10 receives information by entry through the keyboard 14, pointing/clicking device 16, the network interface 24 or another input device or input port. The computer system 10 may be any of the types well known in the art, such as a mainframe computer, minicomputer, or microcomputer.

Overview

Figure 2:
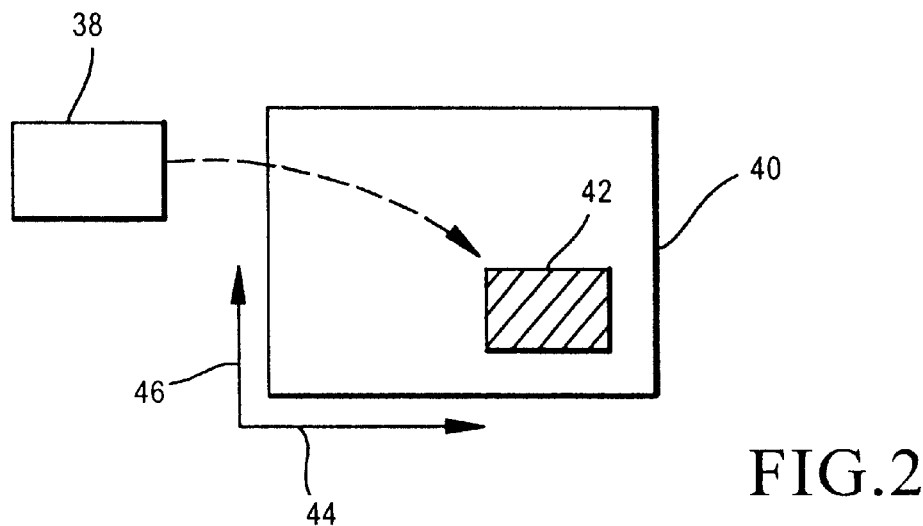
FIG. 2 is a diagram of a template and search area.

Referring to FIG. 2, to search for the location of a template 38 of data within a search area 40 of data, the template is overlaid onto a window 42 of the search area. The search area 40 is an image or another domain of data points. The window area 42 is a subportion of the search area. The template 38 includes a plurality of data points organized into an array spanning a first axis and a second axis. The template's (38) plurality of data points are spaced to a first precision along a one axis and a second precision along another axis. The search area 40 includes a plurality of data points organized into an array spanning a first axis 44 and a second axis 46. The search area's 40 plurality of data points are spaced to a third precision along the first axis 44 and a fourth precision along the second axis 46. One template axis is parallel to one of either the first axis 44 or second axis 46 and the other template axis is parallel to the other of either the first axis 44 or the second axis 46. The first precision is equal to the precision of the search area's 40 plurality of data along said one of either the first axis 44 or second axis 46. Also, the second precision is equal to the precision of the search area's 40 plurality of data along the other of either the first axis 44 or second axis 46. The template data points are compared to the window's data points to determine if the data points correlate to a desired degree. If they do, then a match for the template has been found. In a search area 40 formed by 'm' rows of 'n' data points, a template formed by 'k' rows of 'p' data points may be placed over (m−k+1)*(n−p+1) potential windows 42.

To reduce the number of windows 42 that the template 38 is compared with, an effective step size is derived from the template. According to a 2-dimensional implementation embodiment, a step size along a first axis 44 is derived and a step size along a second axis 46 is derived. Rather then compare the template to every possible window of the search area 40, the template 38 is moved along either or both of the first axis 44 and second axis 46 by the corresponding first axis step size or second axis step size.

Once the desired step sizes are derived, then the template 38 is compared to the various windows 42 of the search area 40 at the step size increments during a fast search process. In one embodiment the comparison is a correlation function of the template 38 and the window 42 and results in a correlation coefficient. Any window 42 in which the correlation coefficient with the template 38 is found to exceed a specific value is a local match for the template. In a preferred embodiment the specific value is the cut value times a threshold value.

Next, a full search then is performed in the vicinity of any location which is a local match. A full search of such vicinity encompasses performing a correlation between the template and every potential search area window between the local match location window and the windows at the prior and next step in each of the horizontal and vertical axes. For example, if the horizontal step size is 3 pixels and the vertical step size is 4 pixels, then correlations are performed for windows ±1 pixel and ±2 pixels along the horizontal axis and ±1 pixel, ±2 pixels and ±3 pixels along the vertical axis. In addition correlations are performed for windows off the axes within the area delineated by the step sizes. Thus, the full search of the vicinity of the local match for this example includes (2*2+1)*(2*3+1)−1=34 correlations between the template and the search area. Any locations among the local match locations and the locations tested during the full search of the vicinity which exceed the threshold value are considered template matches. In some embodiments, the only the location having the highest correlation is considered a match. In other embodiments there may be multiple matches. Thus, the top matches or all matches above the threshold are selected as resultant matches.

Determining Step Size

Figure 3:
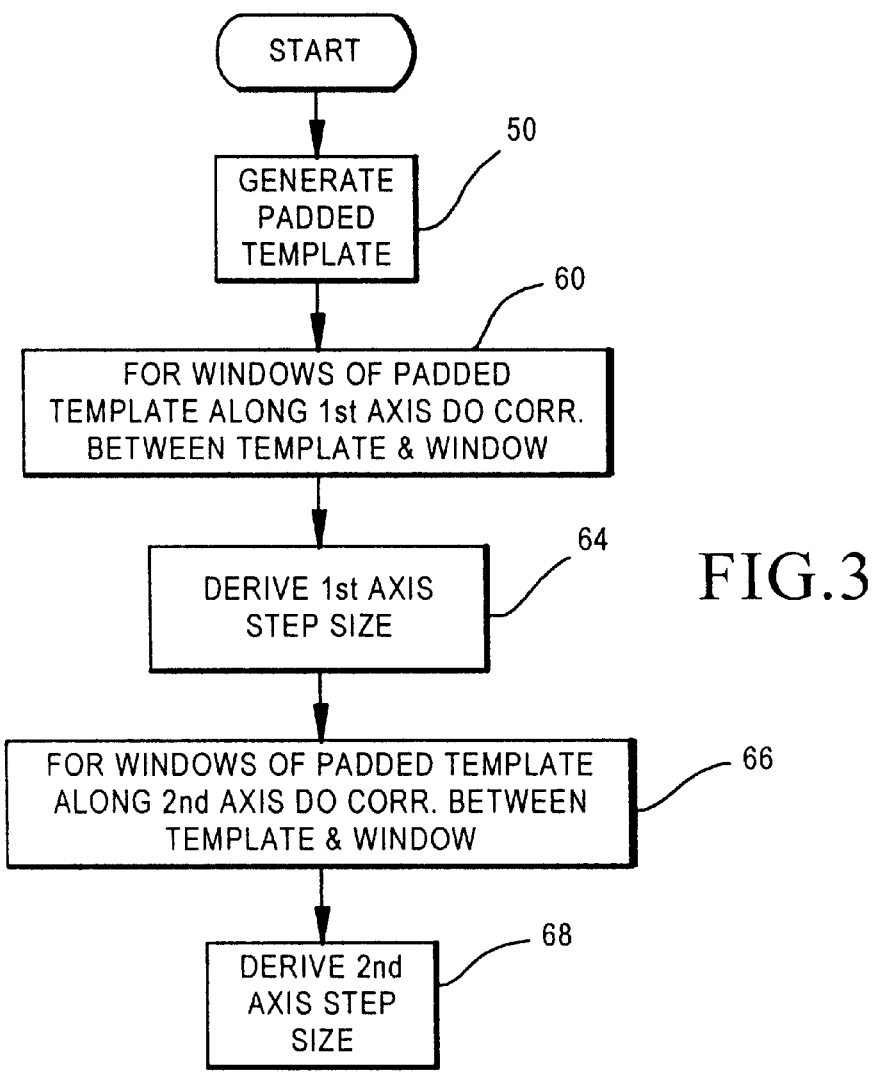
FIG. 3 is a flow chart of a process for determining CAPS step sizes according to an embodiment of this invention.
Figure 4:
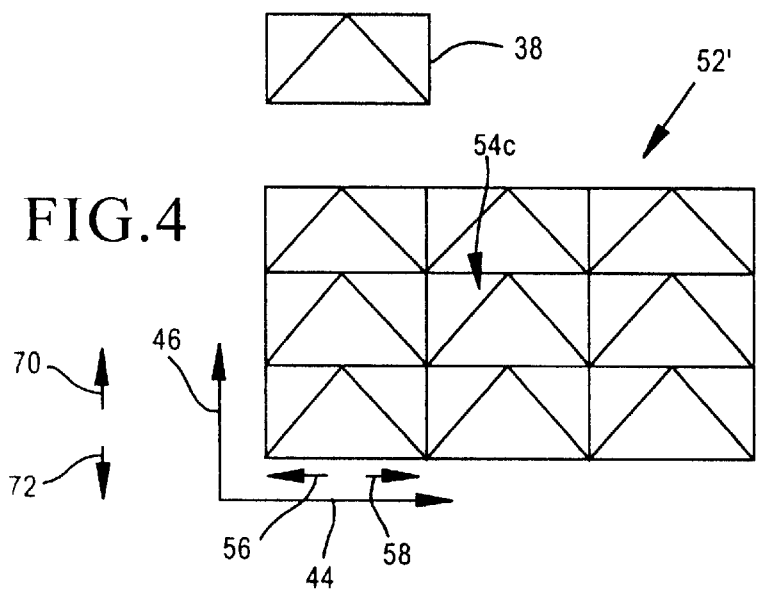
FIG. 4 is a diagram of a circularly padded template.

To determine effective step sizes, the template 38 itself is analyzed. Referring to FIG. 3, at a first step 50 the template 38 is padded with additional data points to achieve a padded template 52. FIG. 4 shows an example of a padded template 52' achieved by circular padding. For circular padding, multiple copies of the template 38 are used to increase the template size. In the illustrated embodiment an array of 9 copies of the original template 38 are used with a center window 54c of the padded template 52' being the original template 38. The number of copies may vary for differing embodiments. In a preferred embodiment there are at least 9 full copies of the template in the circularly padded template.

Figure 5:
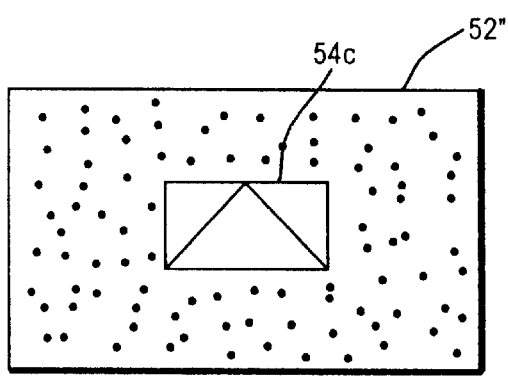
FIG. 5 is a diagram of a linearly padded template.

FIG. 5 shows an example of a padded template 52" achieved by linear padding. For linear padding, data points are added in which each data point has a common value. The common value is a padding constant. In one embodiment the padding constant may be 0 or another fixed value. In a preferred embodiment the padding constant is derived from the data values of the various data points which make up the template 38. For example, in one embodiment an average data value is derived for all the temple 38 data points using any of various averaging techniques. This average value serves as the padding constant. For image data, the added data points are pixels and the padding constant is a pixel intensity and/or color. Preferably the center window 54c of the padded template 52" formed by linear padding also is formed by the original template 38.

Referring again to FIG. 3, at another step 60 the template 38 is correlated to various windows 54 of the padded template 52. Because the center of the padded template 52 equals the original template 38, it is known that the correlation between the template 38 and the center window 54c is 1.0. Thus, that correlation need not be calculated. It is already known. For a two dimensional analysis, a correlation between the original template 38 and windows 54 of the padded template are derived for windows along either of such axes 44,46 moving in either direction away from the center window 54c. The step size for selecting adjacent window to evaluate is one data point. Consider for example a template which is 40 pixels by 60 pixels and a padded template which is 120 pixels by 180 pixels. The step size is one pixel. Starting from the center window 54c, there are 40 potential windows in a first direction 56 along the first axis 44 and 40 potential windows in a second direction 58 along the same axis 44. In step 60 a correlation is performed between the template and the select windows. As the selected window 54 changes along the first axis 44 in a first direction 56, the resulting correlation coefficient is likely to decrease below 1.0. Eventually there will be a window where the correlation coefficient falls to a prescribed cut-off value. Such cut-off value may vary for differing embodiment, but preferably is less than a threshold value which identifies an estimated match between a window and the template. A window will be found in the padded template in each direction along axis 44 where the cut-off criteria is met.

Figure 6:
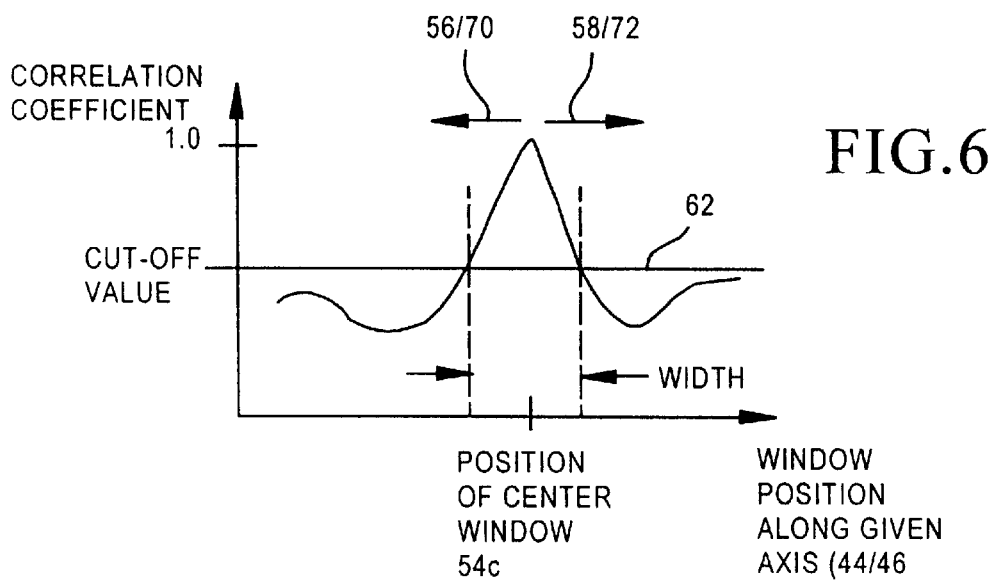
FIG. 6 is a graph of a cross-sectional portion of the correlation between the template and the padded template of FIG. 4 or 5.

Referring to FIG. 6, a graph of correlations between the padded template 52 and the template 38 along the first axis 44 shows a peak at the center and lesser values away from the center. The prescribed cut-off value is indicated as line 62. Line 62 intersects with at least two points on the correlation function. For circular padding there is likely to be more than 1 peak. The closest data point to each side of the maximum peak is used to measure a width along the first axis 44.

Rather than perform a correlation for each potential window along the first axis 44, correlations are performed for windows along the axis 44 away from the center window in each direction 56, 58 until a window is identified in such direction where the correlation coefficient intersects the cut-off value. For two dimensional analysis, there is a cut-off point found in each direction from the center window 54c along the first axis 44. The distance between those two windows in data points is the width along the first axis.

Referring to FIG. 3, at step 64 the first axis step size is derived from the width along the first axis 44 between windows which have a correlation to the template 38 equal to or less than the prescribed cut-off value. The step size along the first axis 44 is a fraction of the width. In a preferred embodiment, one-half the width is taken as the step size for the given axis. In other embodiments, the step size is taken as the entire width or some other fraction of the width.

In steps 66 and 68 the correlations are repeated along the second axis 46 in directions 70, 72 to find a width along the second axis 46. Referring again to FIG. 6, a graph of correlations between the padded template 52 and the template 38 along the second axis 46 shows a peak at the center and lesser values away from the center. The prescribed cut-off value is indicated as line 62. Line 62 intersects with at least two points on the correlation function. For circular padding there is likely to be more than 1 peak. The closest data point to each side of the maximum peak is used to measure a width along the first axis 46. For two dimensional analysis, there is a cut-off point found in each direction from the center window 54c along the second axis 46. The distance between those two windows in data points is the width along the second axis. A fraction of this distance is taken as the step size for the corresponding axis (e.g., first axis, or horizontal, step size; second axis, or vertical, step size). In a preferred embodiment, one-half the width is taken as the step size. In other embodiments, the step size is taken as the entire width or some other fraction of the width. Preferably, the step size along the second axis 46 is derived in the same manner as the step size along the first axis 44. The step sizes are referred to herein as correlative auto-predictive search ('CAPS') step sizes.

Fast Search

Figure 7:
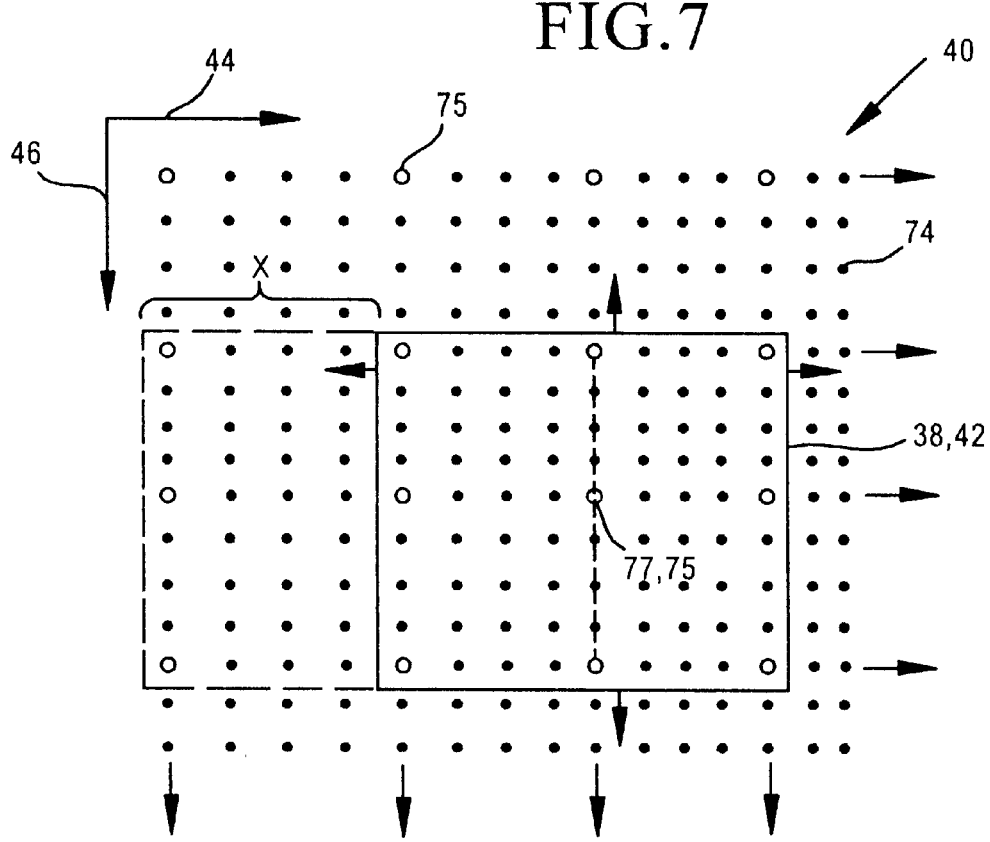
FIG. 7 is a diagram of a search area of data points with a window area to be tested against a template.

Once the CAPS step sizes have been derived, a fast search is performed comparing the template 38 to the search area 40. It is a fast search in the sense that not every potential window of the search area is compared to the template. Referring to FIG. 7, the search area 40 is shown as an array of data points 74, 75 such as image pixels points. The two CAPS step sizes are used for selecting windows from the search area 40 to be compared to the template. The data points in the search area 40 about which the template is centered during successive steps are designated with an open circle and part number 75. Other data pints in the points which are not center points are designated as a data pint 74.

Figure 9:
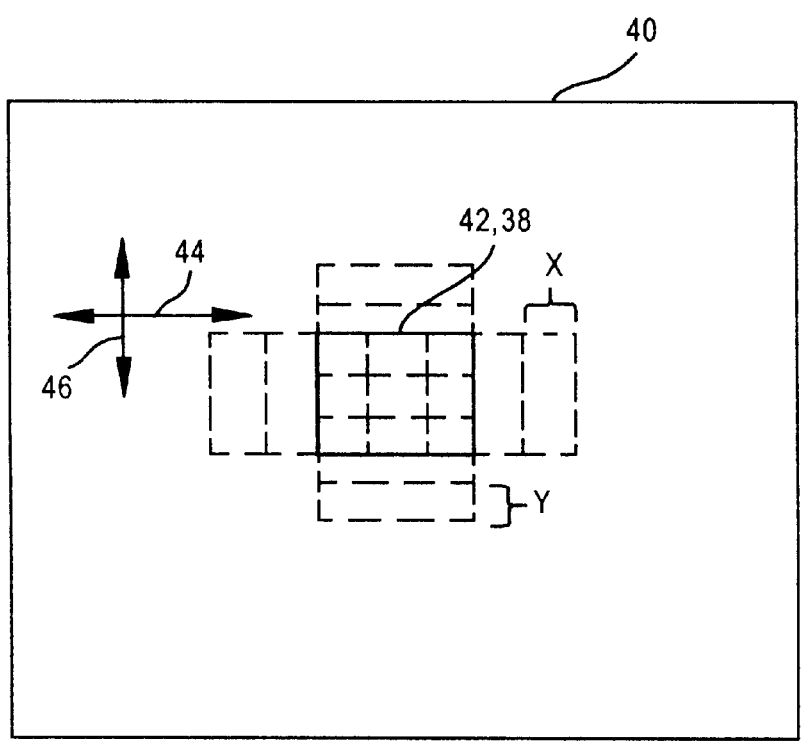
FIG. 9 is a diagram depicting step sizes for selecting windows of the search area to be tested during the fast search process.
Figure 8:
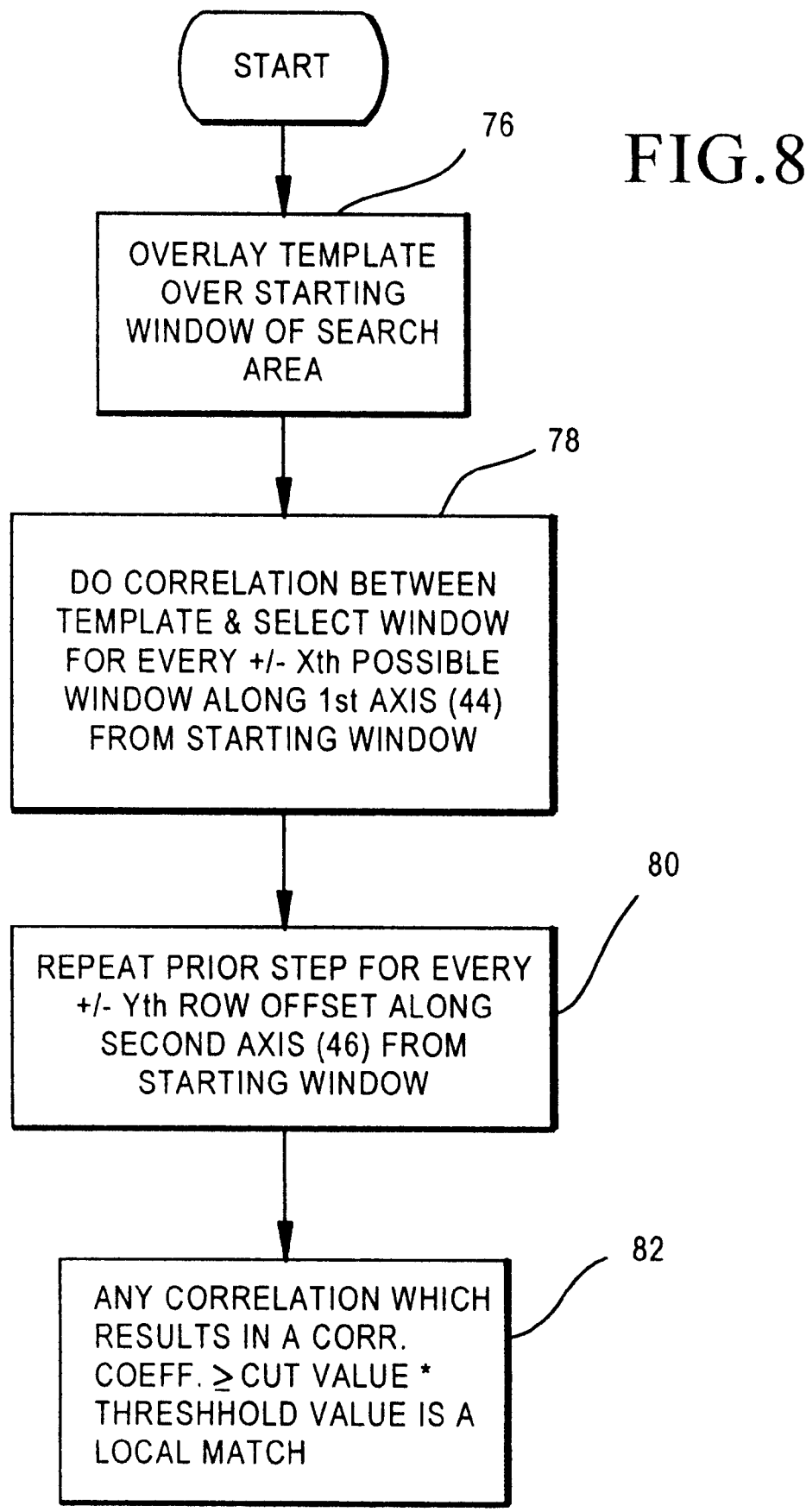
FIG. 8 is a flow chart of a process for performing a fast search of the search area to identify local matches between a template and a subset of window areas of the search area.

Referring to FIGS. 7, 8 and 9, at a step 76 the template 38 (see FIG. 1) is overlayed to a starting window 42 of the search area 40. The starting window can be any window of the search area. At step 78 a correlation is performed between the template 38 and the starting window 42 and every +/−x-th window along the first axis 44, where x is the first axis step size. Thus, for a horizontal axis step size of 'x', the template is shifted along the horizontal axis 44 by x data points at a time. More specifically, a center point 77 of the template 38 coincides with a given pixel 75 for a given iteration. The template then is moved to center over another data point 74 that is x points away from the given pixel 75 along the horizontal axis 44. The template 38 is moved in each direction along the axis 44 using the first step size of x. A correlation is performed at each step.

At step 80 the shifting along the first axis 44 and testing of windows is performed for a template center point repositioned over every y-th row of data points. Specifically, once the initial row of the search area has been tested, the template 38 is moved along the second axis 46 to another row that is y data points away, where y is the second axis step size. This next row then is tested by shifting along the first axis 44 using the first axis step size. A correlation is performed at each iteration. Then another row is tested which is y data points away along the second axis 46. In this manner the template is shifted by the second step size along the second axis 46 and by the first step size along the first axis 44 to select windows to be tested during the fast search. For example, in a search area which is 400 pixels by 400 pixels, and where the first axis step size is four and the second axis step size is four, there are 100*100=10,000 windows tested during the fast search.

Of the tested windows, at step 82 the window location for any correlation which resulted in a correlation coefficient which is greater than or equal to the product of the cut value times a predetermined threshold value is considered a local match. In a preferred embodiment the cut value is the same for each axis. Where the cut value used along one axis differs from the cut value used along the other axis, either cut value may be used. Alternatively, an average of the cut values may be used. The threshold value is a predetermined value and signifies the minimum correlation coefficient acceptable to designate a window as being a match for the template. Typical values are 0.8 and 0.9. The specific value may vary based upon the search area or type of date. The specific value may be determined empirically for different types of data or search area characteristics.

Local Full Search

Figure 10:
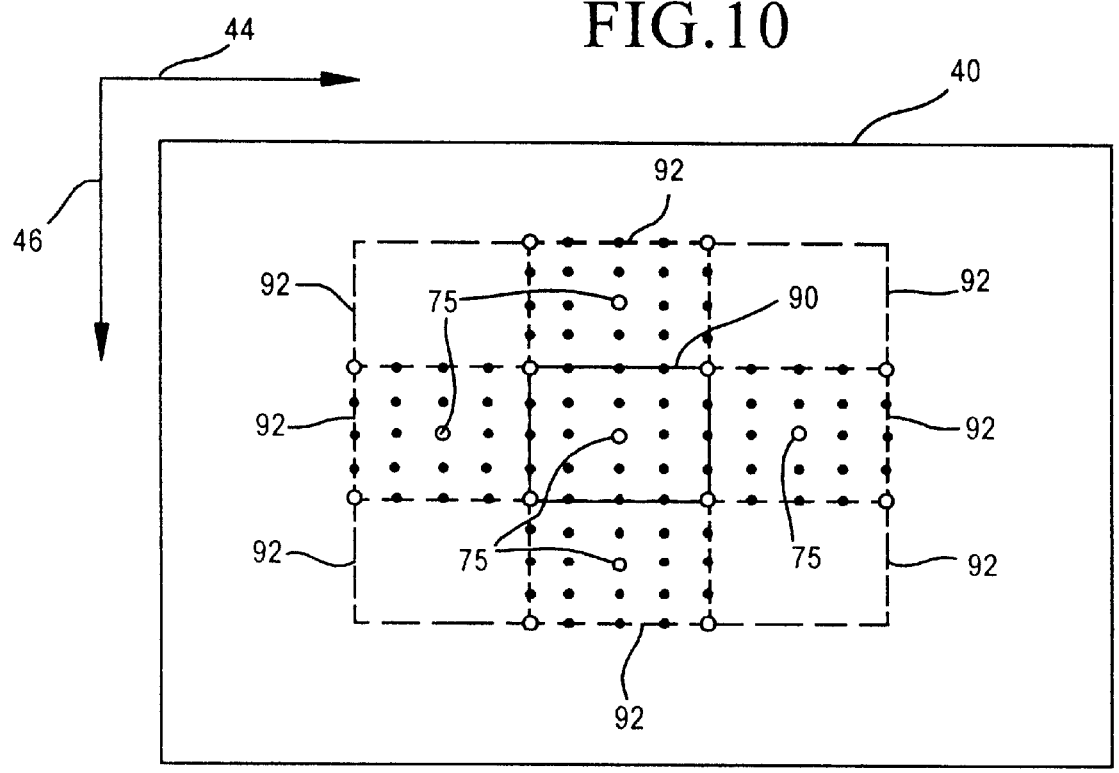
FIG. 10 is a diagram of the search area of FIG. 7 showing a window identified as a local template match.

Once the fast search is complete (or during the course of the fast search), a local full search is performed about each of the local matches. Referring to FIG. 10, for a given window 90 of the search area 40 which is a local match, the windows 92 which are within a 2-dimensional area bounded by the step sizes (for the respective axes) are tested by a local full search. Note that the windows which are exactly a step size away along either axis 44, 46 were already tested during the fast search. To do the local full search we test all the intermediary windows in the area between the local match and the windows plus or minus one step size away along either axis 44, 46. For example, given a first axis step size of x and a second axis step size of y, the windows having a center point which are +/−0, 1, 2, . . . , x−1 data points away from the locally matched window along the first axis, and +/−0, 1, 2, . . . , y−1 data points away from the locally matched window along the second axis, are tested during the full search. Although, the local match need not be recorrelated.

Figure 11:
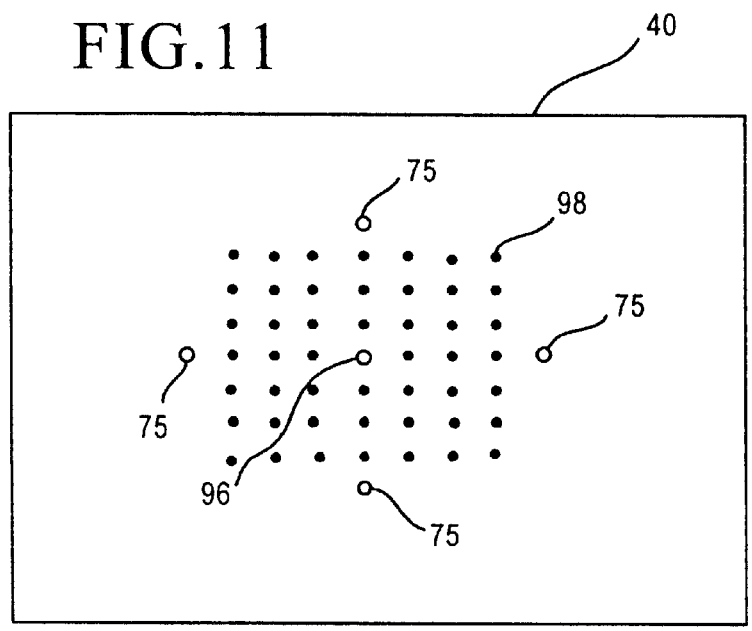
FIG. 11 is a diagram of center data points for windows in the vicinity of the local template match to be tested for a better match (also shown are center points for nearby windows tested during the fast search).

Referring to FIG. 11, the window corresponding to the local match has a center data point 96. The template is moved at a step interval of one data point in either direction along either axis up to but not including the data point which in one step size away. As the template is moved over this area, the windows tested during the local full search will have a center data point 98. FIG. 11 shows all the center points 98 for a given local full search as black dots for an implementation in which the first axis step size is four and the second axis step size is four. FIG. 11 shows the nearby center points from the fast search as open dots 75.

A correlation is performed between the template 38 and each window in the vicinity of the local match. For the vicinity shown in FIG. 11 in which the step is four, there are 48 additional windows tested. Any of the additional 48 windows or the local match which has a correlation coefficient which equals or exceeds the threshold value is a match of the template. Alternatively, of the windows where the correlation coefficient exceeds the threshold value, only the window or windows having the highest correlation coefficient(s) are selected as matched. For example, one or more windows may have the same correlation coefficient which is highest. As another example the windows corresponding to the top 'n' correlation coefficients may be selected, where each window correlation coefficient also exceeds the threshold value.

Implementing the Correlation Function

The correlation coefficient for a correlation between two data sets 'a' and 'b' is defined below. The data set 'a' is the template 38 or an estimate or coarse representation of the template. In a preferred embodiment it is the template 38. The data set 'b' is a window of the padded template 52 (or of a rotational offset of the padded template) for the process of finding the CAPS step sizes. The data set 'b' is a window of the search area 40 (or of a rotational offset of the search area) for the process of identifying candidate locations, potential template matches or template matches. Each of data sets 'a' and 'b' may be a matrix, image or another set of data points. The correlation coefficient, corr is:

$$corr = \frac{E\{[a - E(a)] * [b - E(b)]\}}{sd(a) * sd(b)}$$

which may be simplified to $$corr = \frac{E(a*b) - E(a)*E(b)}{sd(a)*sd(b)}$$

where $E(x)$ = expected value of data set $(x)$ $sd(x)$ = standard deviation of data set $(x)$ and $corr$ is between $-1.0$ and $+1.0$.

Meritorious and Advantageous Effects

One advantage of the invention is that template matches are found more quickly and with greater reliability than prior correlation search methods. In particular, this search methodology is more tolerant of noise and offsets of the template as demonstrated empirically by forming a search area from copies of templates altered by lowpass filtering or Gaussian noise.

Although a preferred embodiment of the invention has been illustrated and described, various alternatives, modifications and equivalents may be used. For example, although the fast search is described as performing respective correlations between the template 38 and a subset of window areas, an estimate of the template 38 may be used instead followed by additional correlation using the full template for correlations resulting in a coefficient exceeding a prescribed value.

Further, although the full local search is described to include performing a correlation for each potential window in the vicinity of the local match (e.g., step size equal 1), an intermediate level search may be performed instead using a step size less than the first step size and second step size, but greater than 1. The step size for the intermediate level search may be determined in the same manner as the for the fast search—based on template characteristics. For example, two cut values are used during the process of identifying step sizes. One cut value for a given axis is used to determine the step size for the fast search. The other cut value for the same axis is used to determine the step size for the intermediate level search. The step size for the fast search is to be larger than the step size for the intermediary level search.

In operation, the intermediate level search is performed in the vicinity of all local matches resulting from the fast search, where the vicinity is bounded by the first step size and second step size of the fast search. Any of the windows tested in the intermediate level search which has a correlation to the first template exceeding a prescribed value is an intermediate level search local match. The prescribed value is selected either independent of or in relation to the cut values and threshold value previously described. Next, a full search is performed in the vicinity of the intermediate level search local matches, where the vicinity is bounded by the step sizes used in the intermediate level search. Any one or more of the local matches and full search correlations which have a correlation to the first template exceeding the threshold value are template matches.

As used herein the term vicinity of a window refers to an area bounded by lines one step size away or less and parallel to the search area axes.

Therefore, the foregoing description should not be taken as limiting the scope of the inventions which are defined by the appended claims.

What is claimed is:

1. A method for locating a match between a first template of data and a search area of data, the first template including a first plurality of data points, the search area including a second plurality of data points exceeding in number the first plurality of data points, the method comprising the steps of:

padding the first template with additional data to enlarge the template into a padded template, wherein a first window area within the padded template is formed by the first template and includes the first plurality of data points;

selecting a subset of window areas within the search area by using a step size, the step size being determined by comparing the first template with the padded template; and evaluating a selected subset of window areas for locating a match between the first template of data and the search area of the data;

wherein the step of selecting comprises the steps of:

(a) correlating the first template to window areas within the padded template along a first axis about the first window area to derive a first step size; and (b) correlating the first template to window areas within the padded template along a second axis about the first window area to derive a second step size;

wherein the step of correlating the first template to window areas within the padded template along the first axis about the first window area comprises the steps of:

(i) correlating the first template to window areas within the padded template along the first axis about the first window area to achieve a correlation coefficient for each said window area;

(ii) determining a first distance along the first axis between the first window area and a window area along the first axis in a first direction for which a correlation coefficient conforms to a cut value criteria;

(iii) determining a second distance along the first axis between the first window area and a window area along the first axis in a second direction opposite the first direction for which a correlation coefficient conforms to the cut value criteria; and (iv) deriving a first step size from the first distance and the second distance.

2. The method of claim 1, in which the step of deriving a first step size comprises taking one-half of the sum of the first distance and second distance as the first step size.

3. The method of claim 1, wherein the step of correlating the first template to window areas within the padded template along the second axis about the first window area comprises the steps of:

correlating the first template to window areas within the padded template along the second axis about the first window area to achieve a correlation coefficient for each said window area;

determining a first distance along the second axis between the first window area and a window area along the second axis in a first direction for which a correlation coefficient conforms to a cut value criteria;

determining a second distance along the second axis between the first window area and a window area along the second axis in a second direction opposite the first direction for which a correlation coefficient conforms to the cut value criteria;

deriving a second step size from the first distance along the second axis and the second distance along the second axis.

4. The method of claim 3, in which the step of deriving a second step size comprises taking one-half of the sum of the first distance along the second axis and the second distance along the second axis as the second step size.

5. A method for locating a template match between a first template of data and a window within a search area of data, the first template including a first plurality of data points organized into an array spanning a first axis and a second axis, the first plurality of data points spaced to a first precision along the first axis and a second precision along the second axis, the search area including a second plurality of data points organized into an array spanning a third axis and a fourth axis, the second plurality of data points spaced to a third precision along the third axis and a fourth precision along the fourth axis, wherein the first axis is parallel to one of either the third axis or fourth axis and the second axis is parallel to the other of either the third axis or the fourth axis, and wherein the first precision is equal to the precision of the second plurality of data along said one of either the third axis or fourth axis and the second precision is equal to the precision of the second plurality of data along said other of either the third axis or fourth axis, the method comprising the steps of:

determining a first step size for the third axis and a second step size for the fourth axis using information derived from the first template;

stepping through the search area using either one or both of the first step size and second step size to select window areas within the search area to correlate to the first template;

correlating to the first template each one of the window areas among the selected window areas; and identifying as the template match one or more of the correlated window areas for which the correlation to the first template results in a correlation coefficient exceeding a threshold value.

6. The method of claim 5, further comprising after the step of correlating and before the step of identifying, the steps of:

identifying as a potential template match each one of the correlated window areas for which the correlation to the first template results in a correlation coefficient exceeding a predetermined value, wherein the predetermined value is less than the threshold value;

for each one potential template match, selecting all potential window areas in the vicinity of said one potential template match that are less than the first step size away moving parallel to said one of the third axis and fourth axis and are less than the second step size away moving parallel to the other of said third axis and said fourth axis; and correlating each selected potential window area in the vicinity of said one potential template match to the first template; and wherein the step of identifying the template match identifies one or more of the correlated window areas among the selected subset of window areas and the selected potential window areas for which the correlation to the first template results in a correlation coefficient exceding the threshold value.

* * * * *